(12) United States Patent
Xu et al.

(10) Patent No.: US 6,951,098 B2
(45) Date of Patent: Oct. 4, 2005

(54) METHOD AND SYSTEM FOR CONTROLLING TEMPERATURE OF AN INTERNAL COMBUSTION ENGINE EXHAUST GAS AFTERTREATMENT DEVICE

(75) Inventors: Lifeng Xu, Farmington Hills, MI (US); Jialin Yang, Canton, MI (US); Richard Eugene Baker, Dearborn Heights, MI (US); Robert Walter McCabe, Lathrup Village, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 10/065,597

(22) Filed: Nov. 1, 2002

(65) Prior Publication Data

US 2004/0083719 A1 May 6, 2004

(51) Int. Cl.$^7$ ................................................. F01N 3/00
(52) U.S. Cl. ............................. 60/286; 60/274; 60/285; 60/295; 60/301
(58) Field of Search .......................... 60/274, 285, 295, 60/301, 286, 311

(56) References Cited

U.S. PATENT DOCUMENTS

| 4,720,972 | A |   | 1/1988  | Rao et al. |
|-----------|---|---|---------|------------|
| 5,964,088 | A | * | 10/1999 | Kinugasa et al. ............. 60/286 |
| 6,109,024 | A | * | 8/2000  | Kinugasa et al. ............. 60/285 |
| 6,237,330 | B1 | * | 5/2001 | Takahashi et al. ............ 60/285 |
| 6,421,599 | B1 |   | 7/2002 | Lippa et al. |
| 2004/0040287 | A1 | * | 3/2004 | Beutel et al. ................. 60/285 |

FOREIGN PATENT DOCUMENTS

| EP | 0165922 B1 | 2/1989 |
|----|------------|--------|
| JP | 09-137716  | 5/1997 |
| WO | WO 93/00503 | 1/1993 |

* cited by examiner

*Primary Examiner*—Thomas Denion
*Assistant Examiner*—Diem Tran
(74) *Attorney, Agent, or Firm*—Diana D. Brehob (57) ABSTRACT

A method for controlling torque in an internal combustion engine to cause an increase in temperature in an exhaust aftertreatment device is disclosed. One group cylinders feed exhaust gases to one exhaust aftertreatment device and another group of cylinders feed exhaust gases to another exhaust aftertreatment device. By operating the groups of cylinders at different operating conditions, the desired temperature in one of the exhaust aftertreatment devices can be achieved while also providing driver demanded torque.

32 Claims, 8 Drawing Sheets

METHOD AND SYSTEM FOR CONTROLLING TEMPERATURE OF AN INTERNAL COMBUSTION ENGINE EXHAUST GAS AFTERTREATMENT DEVICE

BACKGROUND OF INVENTION

1. Field of the Invention

The present invention relates to internal combustion engines and more particularly to methods and systems for controlling temperature of exhaust gas aftertreatment devices used with such engines.

2. Background of the Invention

As is known in the art, exhaust gas aftertreatment devices are generally used with vehicular internal combustion engines. One type of such device is a particulate filter type device. Such (PF) device traps carbon particles from the exhaust gas stream of the engine. Over time, PF becomes occluded with carbon particles. If allowed to continue, flow through PF can become impeded. To avoid deleterious effects on the engine, the PF is regenerated by the reaction of soot with NO2 or O2. In the former PF regeneration method, an oxidation catalyst is placed upstream of the PF or the PF is coated with precious metal, thereby oxidizing NO in the exhaust gas to NO2 for regeneration of the PF. To efficiently generate NO2, the oxidation catalyst or the PF are above 300 degree C. Effective PF regeneration by the latter PF regeneration method occurs when the temperature of PF is above 450 degrees C. Such temperature is exceeded when the engine is at a high load operating condition. However, it is not always possible for the engine to operate at such a high load condition to provide the removal of the particulates.

As a consequence, the prior art contains a variety of methods to cause the PF to attain regeneration temperature including: electrical heating, operating auxiliary devices to cause the engine to operate at a higher load condition than otherwise required to provide desired torque, injecting additional fuel in the exhaust, and others. These methods increase the engine's fuel consumption.

SUMMARY OF INVENTION

The inventors of the present invention have recognized a temperature of an internal combustion engine exhaust gas aftertreatment device can be controlled without penalizing fuel economy.

In accordance with the present invention, a method and system are provided for controlling temperature of an internal combustion engine exhaust gas aftertreatment device. The method includes estimating temperature in the aftertreatment device and operating a first portion of a plurality of engine cylinders at a first torque output and operating a second portion of the plurality of engine cylinders at a second torque output when said temperature is not within a desired temperature range. The overall torque output of the engine is substantially an operator demanded torque. The first portion of cylinders is coupled to the aftertreatment device and the second portion of cylinders is decoupled from the aftertreatment device.

With such method, the temperature of an aftertreatment device coupled to exhaust from the first portion of the plurality of cylinders is increased when the first torque is greater than the second torque. Further, if it is desired to reduce the temperature of an aftertreatment device, such temperature is decreased when the first torque is less than the second torque.

In accordance with another feature of the invention a method for controlling an internal combustion engine is provided. The engine is a multi-cylinder engine with a first group of cylinders coupled to an exhaust aftertreatment device and a second group of cylinders de-coupled from the exhaust aftertreatment device. The first group of cylinders is operated at a first operating condition and the second group of cylinders is operated at a second operating condition. The first operating condition generates a higher torque than the second operating condition and the second operating condition provides positive torque. In a refinement, a driver demanded torque is determined and the first and second operating conditions are determined such that the engine delivers substantially driver demanded torque. Further, the first operating condition is selected to provide the temperature rise desired in the exhaust aftertreatment device.

An advantage of the present method is that because the total torque provided by the engine equals the driver demanded torque, the fuel efficiency of the engine is not impaired.

In another embodiment, a method for controlling a multi-cylinder diesel engine is disclosed. The engine has a first group of cylinders coupled to a first lean NOx catalyst and a second group of cylinders coupled to a second lean NOx catalyst. Fuel delivery is discontinued to the first group of cylinders. The second group of cylinders is operated at an operating condition which causes the engine to deliver the operated demanded torque. A reductant injector is provided upstream of the first lean NOx catalyst. When sufficient reductant has been supplied, the first and second groups of cylinders resume operation according to a normal operating strategy. In the normal strategy, all of the cylinders provide approximately the same torque level.

Yet another advantage of the present method is that, in engines with multiple aftertreatment devices provided for different cylinder groups, additional hardware is not required to carry out the invention.

Also disclosed is a method for controlling a multi-cylinder diesel engine having a first group of cylinders coupled to a lean NOx catalyst, a second group of cylinders not coupled to the lean NOx catalyst, and an reductant injector disposed in an engine exhaust coupled to the first group of cylinders. When actuated, the injector provides reductant to the lean NOx catalyst. If the driver demanded torque is greater than a predetermined torque, the engine is operated such that the first group of cylinders provides a higher torque than the second group of cylinders. The higher torque causes the temperature in the Lean NOx catalyst to exceed about 350 degrees C. Upon achieving that temperature, the injector is caused to provide reductant to the lean NOx catalyst. If the driver demanded torque is less than the predetermined torque, the engine is operated so that fuel supply to the first group of cylinders is shut off. The second group of cylinders is operated such-that they provide the driver demanded torque. The injector is caused to provide reductant to the lean NOx catalyst coupled to the first group of cylinders.

An advantage of an aspect of the present invention is that there are two modes by which the reductant can be supplied to the LNC: at a temperature greater than 350 degrees C.; and when there is no combustion in the group of cylinders coupled to the LNC. By having two methods, the former more applicable to higher torque conditions and the latter more applicable to lower torque conditions, the more advantageous method can be applied subject to operator demanded torque.

The above advantages, other advantages, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
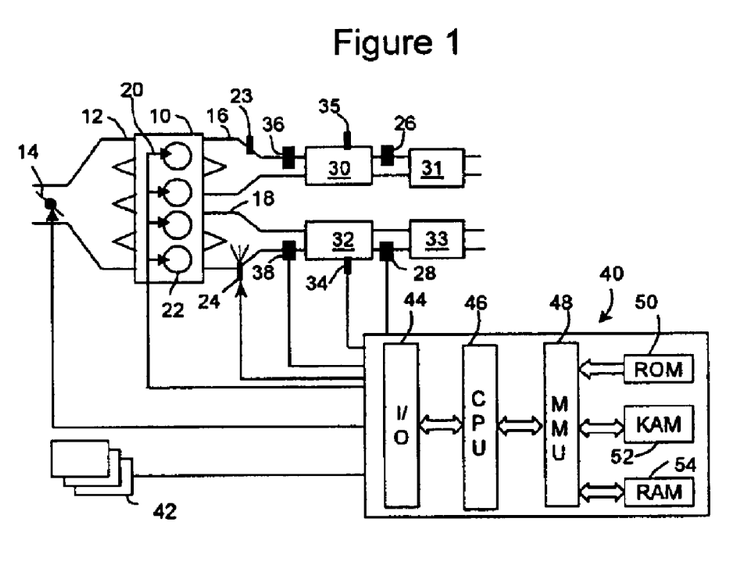
FIG. 1 is a schematic of an engine equipped according to an aspect of the present invention.

In FIG. 1, an internal combustion engine 10 is shown. Engine 10 is, preferably, a diesel engine. However, the invention claimed herein is applicable to other engines such as spark-ignited gasoline engines or homogeneous charge compression ignition engines.

FIG. 1 shows, by way of example, a 4-cylinder engine 10. Engines having 6, 8, 10, 12 or other even number of cylinders can be used for this invention, having the exhaust collected into at least 2 paths. Engine 10 is supplied air through an intake manifold 12 with a throttle valve 14. Typically, diesel engines are equipped with a throttle valve 14 or exhaust pressure control to cause a pressure depression between exhaust manifold 16 and intake manifold 12, even during boosted operation, so exhaust gases can be recirculated from the exhaust system through an exhaust gas recirculation system (not shown). Fuel injectors 20 supply fuel into cylinders 22 of engine 10. Engine 10 has two cylinders supplying exhaust gases to exhaust manifold 16 which couples to exhaust aftertreatment device 30.

In one embodiment, exhaust aftertreatment device 30 is a lean NOx catalyst (LNC). Injector 24 supplies reductant to LNC 30. Exhaust gas composition sensors 38 and 28 are placed upstream and downstream of LNC 30, respectively. The corresponding equipment for the other two cylinders is: exhaust manifold 18, exhaust aftertreatment device 32, exhaust gas composition sensors 36 and 26, and injector 23. Also shown are temperature sensors 34 and 35 in exhaust aftertreatment devices 32 and 30, respectively. The temperature sensors can be placed upstream or downstream of aftertreatment devices 30 and 32, or anywhere in the exhaust ducts such that their signals are indicative of aftertreatment device temperature. In an alternative embodiment, temperature is not measured, but instead modeled based on engine operating conditions.

Connections between elements 23, 36, 35, and 26 and ECU 40 are not shown in FIG. 1 for the sake of clarity. Elements 23, 36, 35, and 26 are similarly connected to the I/O of ECU 40 as elements 24, 38, 34, and 28.

For engine 10 shown in FIG. 1, the exhaust lines exiting exhaust aftertreatment devices 30 and 32 are maintained separately. Alternatively, the two exhaust ducts are coupled together downstream of devices 30 and 32. In another alternative, the combined exhaust flows through another aftertreatment device.

In the embodiment in which the two exhaust ducts are combined into one duct downstream of exhaust aftertreatment devices 30 and 32, a first group of cylinders coupled to a first exhaust aftertreatment device is not considered to be coupled to the second exhaust aftertreatment device due to the combining of the exhaust ducts because the combining is performed downstream of the first and second (or more) exhaust aftertreatment devices 30 and 32. Because the gases flowing through device 30 are distinct from gases flowing through device 32 and mix only after exiting their respective aftertreatment devices, the two devices 30 and 32 are not considered coupled together. In other words, the first group of cylinders is decoupled from the second aftertreatment device.

In FIG. 1, a first group of cylinders is coupled to aftertreatment device 30 and a second group of cylinders is coupled to aftertreatment device 32. The first and second groups of cylinders are mutually exclusive. That is, no cylinder in the first group is also a member of the second group and vice versa.

The embodiment shown in FIG. 1 has two aftertreatment devices processing different exhaust streams, by way of example. The present invention is not limited to two aftertreatment devices. If the case of an in-line six-cylinder engine, a separate exhaust manifold and aftertreatment device can be provided for each cylinder pair. V engines, such as V-6, V-8, V-10, or V-12 configurations, are well suited for the present invention as they normally have each of the two cylinder banks coupled to a separate exhaust manifold.

Alternatively, exhaust aftertreatment device 30, of FIG. 1, is a particulate filter (PF). PF 30 is regenerated by causing the temperature within PF 30 to exceed the ignition temperature of collected carbon matter. Once the carbon attains the ignition temperature, oxidation usually continues until the carbon is consumed.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve position, spark plug timing (in the event that engine 10 is a spark-ignition engine), reductant injection, and others. Sensors 42 communicating input through I/O interface 44 may be indicating piston position, engine rotational speed, vehicle speed, coolant temperature, intake manifold pressure, accelerator pedal position, throttle valve position, air temperature, exhaust temperature, exhaust stoichiometry, exhaust component concentration, and air flow. Specific sensors shown in FIG. 1 are exhaust gas component sensors 26, 28, 36, and 38. In one embodiment, the exhaust gas component sensors are NOx sensors. Alternatively, the sensors are reductant sensors. In another embodiment, the sensors are exhaust gas oxygen sensors. In a further alternative, a combination of sensors are installed in place of any element: 26, 28, 36, and 38. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

In one aspect of the present invention, a set of operating conditions are provided in a subset of engine cylinders so that a higher exhaust temperature is achieved than would exist if all engine cylinders were operating at the same operating condition.

In the case of a LNC, the threshold temperature above which it is desirable to add reductant is about 350 degrees C.

The temperature at which oxidation occurs in a PF is at most 500 degrees. The ignition temperature of particulate matter collected in the PF can be reduced to as low as about 250 degrees C. by one or more of the following measures: using fuel containing fuel additives, a catalytic coating on the PF, and by introducing exhaust gases in which the NOx is mostly NO2.

A temperature of the exhaust gas aftertreatment device is controlled by operating a first portion of a plurality of engine cylinders at a first torque output and operating a second portion of said plurality of engine cylinders at a second torque output when temperature in the aftertreatment device is not within a desired temperature.

Figure 2:
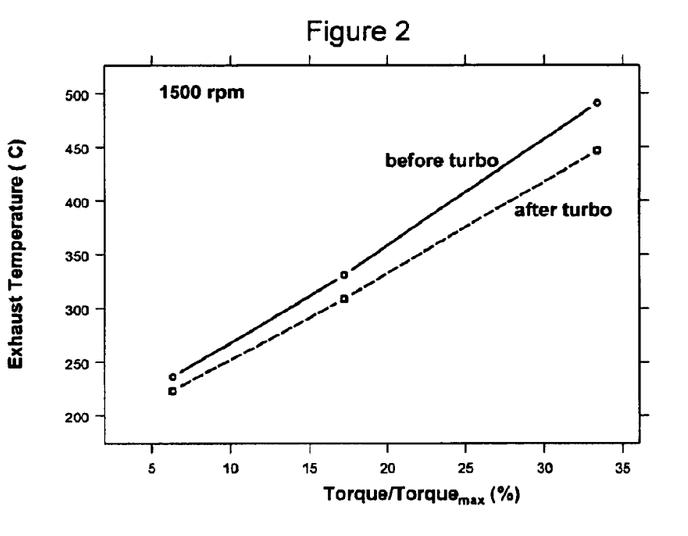
FIG. 2 is a graph showing the exhaust temperature from a production diesel engine as a function of load.

In FIG. 2, a graph of exhaust temperature as a function of engine operating condition is shown for a typical production diesel engine at a location upstream and downstream of a turbocharger. FIG. 1 does not show a turbocharger, which is typically used with diesel engines. In one embodiment, exhaust aftertreatment devices 30 and 32 are located upstream of the exhaust turbine element of the turbocharger. Alternatively, they are located downstream of the exhaust turbine. For the purposes of illustration of the method of the present invention, the following discussion refers to the temperature of the exhaust gases upstream (before) of the turbocharger. If the demanded load from the engine were 15%, the resulting exhaust temperature is about 320 degrees C. For the purposes of adding reductant to the LNC, the desired temperature is greater than 350 degrees C. To obtain 350 degrees C. in one LNC, e.g., element 32 in FIG. 1, engine cylinders coupled to LNC 32 are operated at 19% load. So that the demanded load from the engine does not exceed 15%, the cylinders not coupled to LNC 32 are operated at about 11% load.

The present example refers to the situation where the number of cylinders in each group is equal. Alternatively, the method applies to unequal cylinder groupings. If exhaust aftertreatment device 32 is a PF and desired load from the engine is 20%, cylinders coupled to LNC 32 are operated at 34% load, to achieve the desired 500 deg C., and the other cylinders are operated at about 6% load.

In a patent application Ser. No. 09/682,241, assigned to the assignee of the present invention, the entire subject matter thereof being incorporated herein by reference, a method to operate a lean NOx (NO and NO$_2$) catalyst (LNC) is disclosed. In this method, reductant is supplied to the LNC under particular operating eg., when the temperature in LNC is greater than 350 degrees C. The inventors of patent application '241 have recognized that by storing reductant on active sites within the LNC that the conversion efficiency of the LNC is higher than when the reductant is stored within the catalyst, but not on active sites in the catalyst. The inventors theorize that NOx preferentially absorbs onto the active sites in the LNC and prevents the reductant from accessing active sites. However, when the temperature in the LNC is greater than 350 degrees C., the NOx desorbs and allows reductant to gain access to the active sites. Here, in accordance with this invention, the temperature of the exhaust gas aftertreatment device is controlled, as noted above by operating one portion of a plurality cylinders in the engine with a relatively high torque output and another portion of the plurality cylinders at a relatively low torque output, with the overall torque output of the engine being the operator demanded torque.

In another embodiment, reductant is supplied to the LNC continuously when the temperature in the LNC is above the LNC activation temperature, which is about 225 degrees C.

Figure 3:
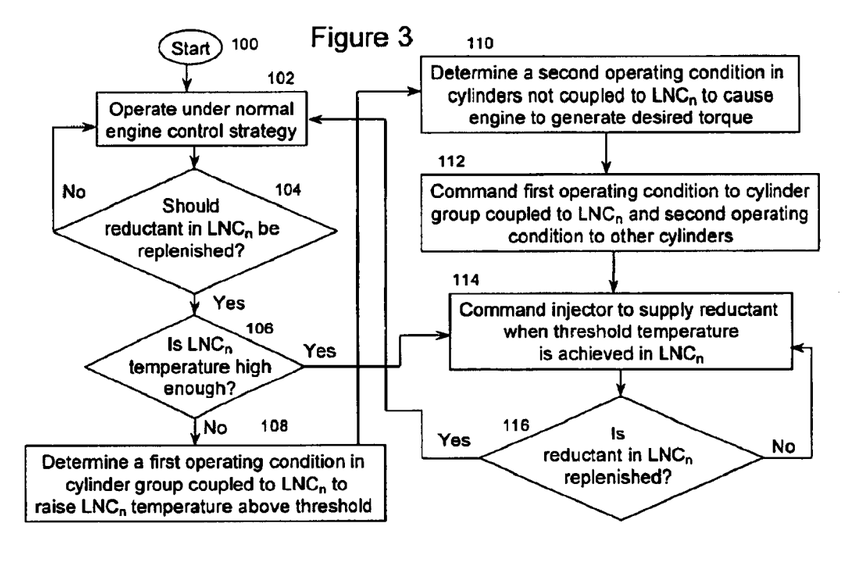
FIGS. 3–8 each show a control strategy according to an aspect of the present invention.

Referring now to FIG. 3, a control strategy, according to the present invention, starts with step 100. Engine 10 is operated according to a normal engine strategy in step 102. In step 104, it is determined whether the nth LNC is in need of replenishment of reductant. If not, control returns to step 102. If yes, control proceeds to step 106 in which it is determined whether the temperature in the nth LNC is high enough. If yes, control proceeds to step 1114 and reductant is injected. If a negative result is obtained from block 106, control passes to step 108 in which it is determined a first operating condition that would cause a temperature increase in LNC$_n$ to the desired temperature. In step 110, a second operating condition is also determined that will cause the torque developed by the engine to meet torque demanded by the operator. In step 112, the first operating condition is commanded to the cylinders coupled to LNC$_n$ and the second operating condition is commanded to the cylinders other than those coupled to LNC$_n$. When the desired (or threshold) temperature is achieved in LNC$_n$, reductant is supplied to LNC$_n$, in step 114. Injection of reductant continues, until, in step 116, it is determined that LNC$_n$ is replenished. A positive result from step 116 passes control to step 102 where engine 10 is restored to normal engine operating strategy.

The strategy in FIG. 3 is repeated for each LNC in the system. Thus, if there are two LNCs, the strategy is conducted once for n=1 and once for n=2. If three LNCs, n=1, 2, and 3.

Figure 4:
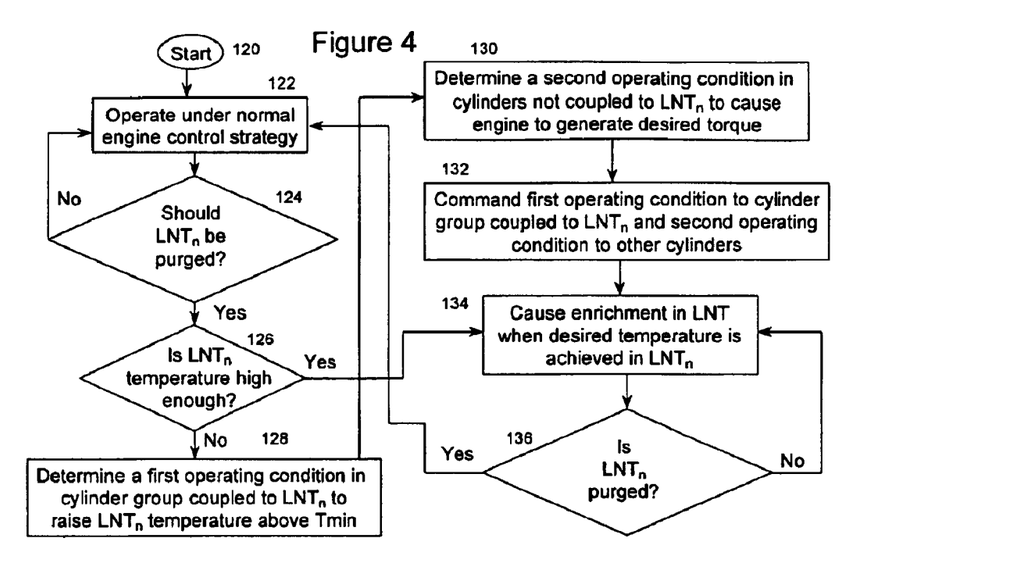

Alternatively, engine 10 is a stratified-charge, spark-ignition engine and exhaust aftertreatment devices 30 and 32 are lean NOx traps (LNTs). A similar strategy to that employed in FIG. 3 is shown in FIG. 4 for purging NOx from LNTs. That is, after starting (step 120) and operating normally (step 122) in step 124, it is determined whether LNT$_n$ is full and should be purged and, in step 126, whether LNT$_n$ is hot enough to be purged. Purging, in this context, means that NOx stored in the LNT is desorbed from the LNT and subsequently reacted. If LNT$_n$ is warm enough, control passes to step 134 in which the purging conditions are provided in LNT$_n$. Besides the temperature, a rich condition causes desorption and reaction of the NOx. If a negative result is obtained from step 126, control passes to step 128 in which an operating condition is determined which would cause a rise in LNT$_n$ temperature above Tmin. The minimum LNT$_n$ temperature (Tmin) for purging is approximately 250 degrees C. Control continues to step 130, in which a second operating condition is determined for the other cylinders, i.e., those not coupled to $LNT_n$. In step 132, the first and second operating conditions are commanded to the first and second groups of cylinders, respectively. Control passes to step 134 in which the purge is conducted. In step 136, it is determined whether the purge has been completed. If not, return to step 134. If purge is completed, control returns to step 122 for operation under a normal strategy.

Figure 5:
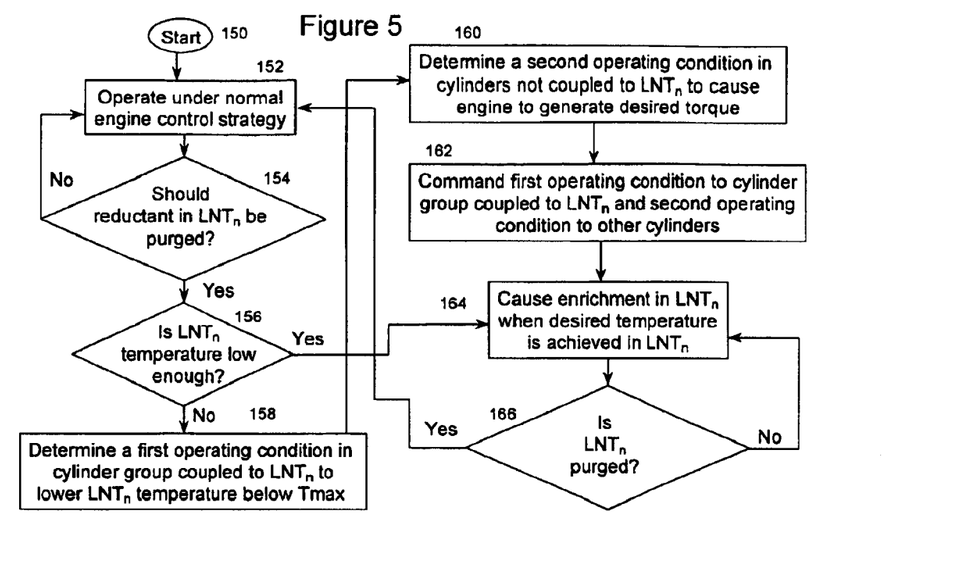

The LNT has a temperature maximum for purging, which is about 450 degrees C. Purging typically leads to an exotherm (energy release causing a temperature rise) in the LNT. Thus, it is advisable to start the purging process at a slightly lower temperature than the maximum temperature. A temperature of 425 degrees C. is sufficiently below the temperature maximum thereby ensuring that the energy release during purging doesn't cause the LNT to exceed the temperature maximum. An operating strategy to accomplish this is shown in FIG. 5. The strategy is very similar to that shown in FIG. 4. Only the differences between the two strategies are highlighted. In step 156, it is determined whether $LNT_n$ temperature is low enough to purge. If yes, control passes to step 164 for purging. If not, control passes to step 158 in which an operating condition causing $LNT_n$ temperature to be less than Tmax is determined. Tmax, is about 450 degrees C.

It is likely that for there to be enough range of authority in obtaining two distinct operating conditions in the first and second groups of cylinders, such as required for the strategies shown in FIGS. 4 and 5, that engine 10 of FIG. 1 would be equipped with two separated intake manifolds, each with a throttle valve upstream of each manifold. Alternatively, the engine is equipped with port throttles at each intake port. In yet another alternative, the engine is provided with mechanisms for varying valve timing and/or valve lift to allow sufficient control over air intake for the two groups of cylinders independently. The alternative configurations are not shown in FIG. 1.

Figure 6:
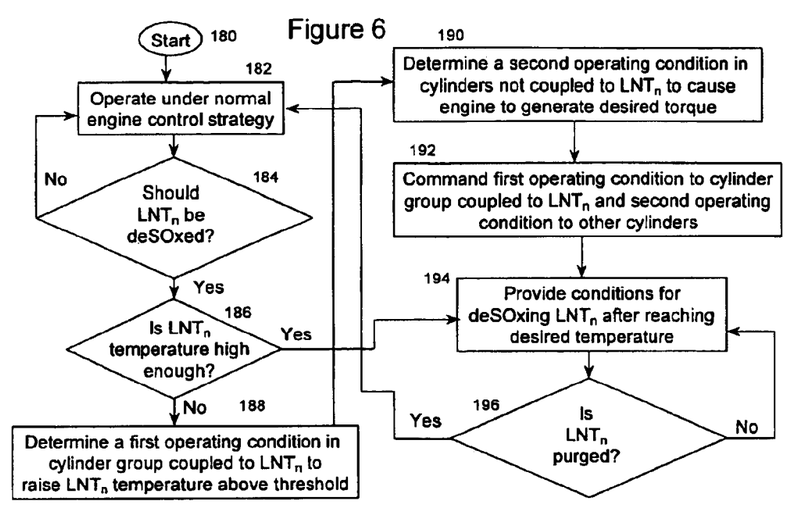

It is known that LNTs absorb SOx ($SO_2$ and $SO_3$), which reduces LNT effectiveness. Periodically, the temperature is raised in LNT to cause the SOx to be released from the LNT (deSOx). In another alternative, a deSOx strategy, according to the present invention, is shown in FIG. 6. After starting (step 180) and operating normally (step 182), in step 184, it is determined whether $LNT_n$ should be taken through deSOx and, in step 126, whether $LNT_n$ is hot enough to deSOx. If $LNT_n$ is warm enough, control passes to step 134 in which the purging conditions are provided in $LNT_n$. If a negative result is obtained from step 186, control passes to step 188 in which an operating condition is determined which would cause a rise in $LNT_n$ temperature above the deSOx temperature. Control continues to step 190, in which a second operating condition is determine for the other cylinders, i.e., those not coupled to $LNT_n$. In step 192, the first and second operating conditions are commanded to the first and second groups of cylinders, respectively. Control passes to step 194 in which the deSOx is performed. In step 196, it is determined whether deSOxing has been completed. If not, return to step 194. If purge is completed, control returns to step 182 for operation under a normal strategy.

Figure 7:
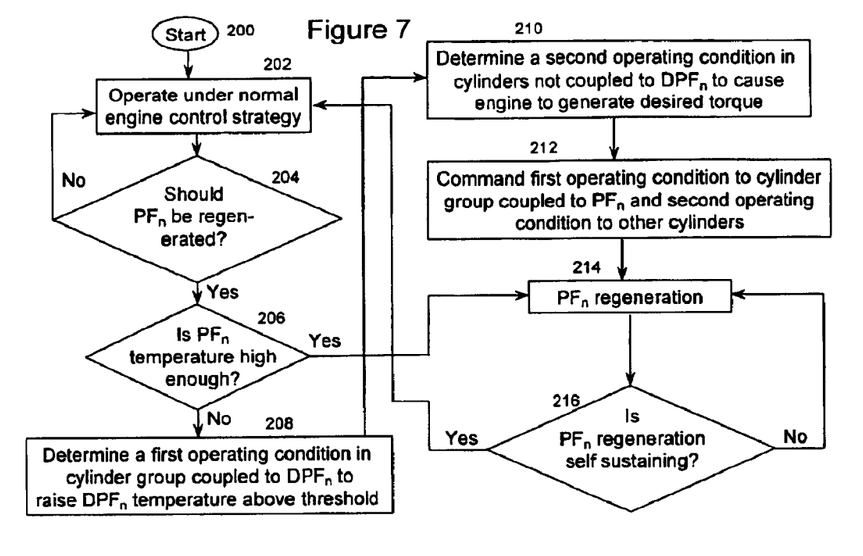

Referring to FIG. 7, a strategy for a PF starts with step 200. Engine 10 is operated according to a normal engine strategy in step 202. In step 204, it is determined whether the nth PF is in need of replenishment of reductant. If not, control returns to step 202. If yes, control proceeds to step 206 in which it is determined whether the temperature in the nth PF is high enough. If yes, control proceeds to step 214 and reductant is injected. If a negative result is obtained from block 206, control passes to step 208 in which it is determined a first operating condition that would cause a temperature increase in $PF_n$ to the desired temperature. In step 210, a second operating condition is also determined that will cause the torque developed by the engine to meet torque demanded by the operator. In step 212, the first operating condition is commanded to the cylinders coupled to $PF_n$ and the second operating condition is commanded to the cylinders other than those coupled to $PF_n$. When the ignition (or threshold) temperature is achieved in $PF_n$, regeneration begins in step 214. After successful ignition in $PF_n$ is initiated, typically, it continues without taking further measures. In this situation, control passes to step 202 where engine 10 is restored to normal engine operating strategy.

Figure 8:
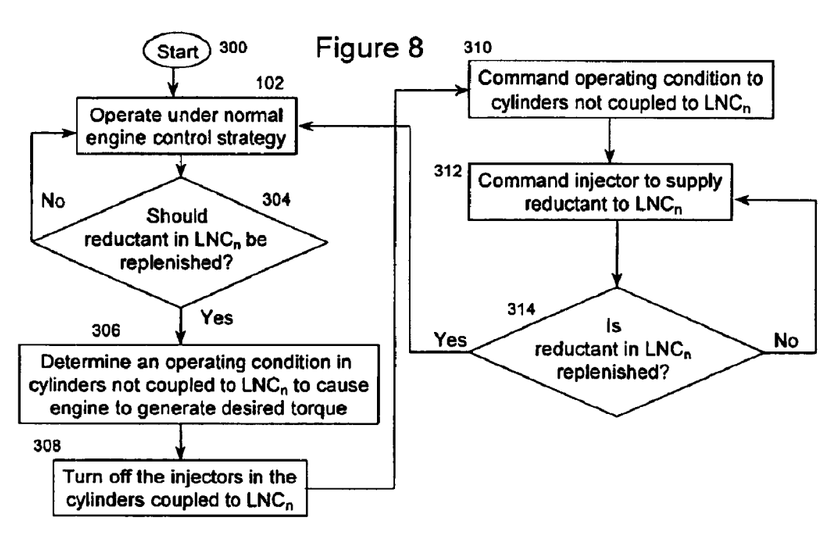

Referring now to FIG. 8, a control strategy, according to the present invention, starts with step 300. Engine 10 is operated according to a normal engine strategy in step 302. In step 304, it is determined whether the nth $LNC_n$ is in need of replenishment of reductant. If not, control returns to step 302. If yes, control proceeds to step 306 an operating condition of the cylinders not coupled to $LNC_n$ is determined which provides the desired torque. Control passes to step 308 in which the injectors to the cylinder coupled to $LNC_n$ are turned off. In step 310, the operating condition determined in step 306 is commanded to the cylinders not coupled to $LNC_n$. In step 312, reductant is supplied to $LNC_n$. Injection of reductant continues, until, in step 314, it is determined that $LNC_n$ is replenished. A positive result from step 314 passes control to step 302 where engine 10 is restored to normal engine operating strategy.

The strategy in FIG. 3 is repeated for each LNC in the system. Thus, if there are two LNCs, the strategy is conducted once for n=1 and once for n=2. If three LNCs, n=1, 2, and 3.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for controlling an internal combustion engine, the engine being a multi-cylinder engine with a first group of cylinders coupled to an exhaust aftertreatment device and a second group of cylinders being decoupled from the exhaust aftertreatment device, the method comprising:

operating the first group of cylinders at a first operating condition;

operating the second group of cylinders at a second operating condition, wherein the first operating condition generates a higher torque than said second operating condition and said second operating condition provides positive torque; and commanding an injector disposed in an engine exhaust to supply reductant to the exhaust aftertreatment device when a temperature in the exhaust aftertreatment device exceeds a threshold temperature when the first group of cylinders a operating at said first operating condition.

2. The method of claim 1 wherein the reductant is urea and the exhaust aftertreatment device is a lean NOx catalyst.

3. The method of claim 1, wherein said first and second operating conditions are such that the engine delivers substantially said driver demanded torque.

4. The method of claim 1, further comprising:
  performing said operating steps when a temperature in the exhaust aftertreatment device is less than a threshold temperature.

5. A method for controlling an internal combustion engine, the engine being a multi-cylinder engine with a first group of cylinders coupled to at exhaust aftertreatment device and a second group of cylinders being decoupled from the exhaust aftertreatment device, the method comprising:
  operating the first group of cylinders at a first operating condition;
  operating the second group of cylinders at a second operating condition, wherein the first operating condition generates a higher torque then said second operating condition and said second operating condition provides positive torque; and
  commanding injectors disposed in engine cylinders of said first group of cylinders to inject fuel during an expansion stroke of the engine when a temperature in the exhaust aftertreatment device exceeds s threshold temperature and the first group of cylinders is operating at said first operating condition wherein said exhaust aftertreatment device is a lean NOx catalyst and said fuel injected during said expansion stroke is applied to said lean NOx catalyst.

6. A method for controlling an internal combustion engine, the engine being a multi-cylinder engine with a first group of cylinders coupled to an exhaust aftertreatment device and a second group of cylinders being decoupled from the exhaust aftertreatment device, the method comprising:
  operating the first group of cylinders at a first operating condition;
  operating the second group of cylinders at a second operating condition, wherein the first operating condition generates a higher torque than said second operating condition and said second operating condition provides positive torque wherein the exhaust aftertreatment device is a lean NOx catalyst and said operating steps are performed when a quantity of reductant stored in said lean NOx catalyst is less than a predetermined quantity.

7. The method of claim 6 wherein said stored quantity is based on an amount of reductant stored in said catalyst under predetermined conditions.

8. The method of claim 7 wherein said predetermined conditions include a temperature in the lean NOx catalyst exceeding a threshold temperature.

9. A method for controlling torque in an internal combustion engine, the engine being a multi-cylinder engine with a first group of cylinders coupled to a first exhaust aftertreatment device and a second group of cylinders coupled to a second exhaust aftertreatment device, the engine having first and second injectors disposed in an engine exhaust, the injectors being capable of supplying reductant to the first and second aftertreatment devices, respectively, the method comprising:
  operating the first group of cylinders at a first operating condition;
  operating the second group of cylinders at a second operating condition, wherein said first operating condition generates a higher torque than said second operating condition; and
  commanding the first injector to provide reductant to the first aftertreatment device when temperature in the first aftertreatment device exceeds a threshold temperature.

10. The method of claim 9 wherein said threshold temperature is 350 degrees C.

11. The method of claim 9, further comprising: selecting said second operating condition to provide a driver demanded torque by the first and second group of cylinders.

12. The method of claim 9, further comprising: discontinuing said commanding to the first injector when a desired amount of reductant has been supplied to the first aftertreatment device.

13. The method of claim 12, further comprising:
  operating the first group of cylinders at said second operating condition;
  operating the second group of cylinders at said first operating condition; and
  commanding the second injector to provide reductant to the second aftertreatment device when temperature in the second aftertreatment device exceeds a threshold temperature.

14. The method of claim 9, wherein said operating steps are initiated when temperature in the first and second aftertreatment devices is less than said threshold temperature.

15. The method of claim 14, wherein said first operating condition causes the first aftertreatment device to achieve said threshold temperature.

16. A system for controlling a multi-cylinder internal combustion engine, the engine having a first group of cylinders and a second group of cylinders wherein the first and second groups of cylinders ate mutually exclusive, comprising:
  a first exhaust manifold coupled to the first group of cylinders;
  an exhaust aftertreatment device coupled to the exhaust manifold;
  an electronic control unit coupled to the engine, said electronic control unit operating the first group of cylinders at a first operating condition and operating the second group of cylinders at a second operating condition, wherein said first and second operating conditions provide positive and unequal torques; and
  a reductant injector located upstream of said exhaust aftertreatment device, said injector being coupled to said electronic control unit wherein said electronic control unit commands said injector to inject reductant when a temperature in said first aftertreatment device exceeds a threshold temperature.

17. The method of claim 16, further comprising: at least one additional exhaust manifold coupled to the second group of cylinders, wherein said exhaust manifold conducts exhaust gases from the cylinders to which it is coupled.

18. The method of claim 16 wherein the groups of cylinders comprise at least one cylinder in each group.

19. A system for controlling a multi-cylinder internal combustion engine, the engine having a first group of cylinders and a second group of cylinders wherein the first and second groups of cylinders are mutually exclusive, comprising:
  a first exhaust manifold coupled to the first group of cylinders;
  an exhaust aftertreatment device coupled to the exhaust manifold; and
  an electronic control unit coupled to the engine, said electronic control unit operating the first group of cylinders at a first operating condition and operating the second group of cylinders at a second operating condition, wherein said first and second operating conditions provide positive and unequal torques, said engine is a lean burn gasoline engine, said exhaust aftertreatment device is a lean NOx trap, and said first operating conditions cause temperature in said lean NOx trap to be lower than an upper operating temperature of said lean NOx trap.

20. The system of claim 19 wherein said upper operating temperature is approximately 425 degrees C.

21. A method for controlling a diesel engine, the engine being a multi-cylinder engine having a first group of cylinders coupled to a first lean NOx catalyst and a second group of cylinders coupled to a second lean NOx catalyst wherein said first and second groups of cylinders are mutually exclusive, the method comprising:

discontinuing fuel delivery to the first group of cylinders;

operating the second group of cylinders at an operating condition providing a driver demanded torque with the fuel delivery to the first group of cylinders being discontinued; and supplying reductant to the first lean NOx catalyst the second group of cylinders being at an operating condition providing a driver demanded torque.

22. The method of claim 21, further comprising:

discontinuing supplying reductant when the lean NOx catalyst has substantially reached storage capacity; and resuming fuel delivery to the first group of cylinders.

23. A method for controlling a diesel engine, the engine being a multi-cylinder engine having a first group of cylinders coupled to a lean NOx catalyst, a second group of cylinders not coupled to the lean NOx catalyst, and a reductant injector disposed in an engine exhaust coupled to the first group of cylinders for providing reductant to the lean NOx catalyst, the method comprising:

operating said first and second groups of cylinders according to a first set of operating conditions when a driver demanded torque is greater than a predetermined torque; and operating said first and second group of cylinders according to a second set of operating conditions when said driver demanded torque is less than said predetermined torque wherein said first and second sets of operating conditions are such that a torque provided by said first group of cylinders is different than a torque provided by said second group of cylinders and said first set of operating conditions, further comprises:

operating the first group of cylinders at a first operating point;

operating the second group of cylinders at a second operating point, wherein said first operating point generates a higher torque than said second operating point and said second operating point provides positive torque; and commanding said injector to provide reductant to the lean NOx catalyst when a temperature within the lean NOx catalyst exceeds a predetermined temperature.

24. The method of claim 23, wherein said predetermined torque is based on at least one of ambient temperature, engine coolant temperature, engine speed, age of the lean NOx catalyst, output from an exhaust gas composition sensor disposed in the engine exhaust, a throttle valve position, an EGR valve position, and timing of valves disposed in engine cylinders.

25. A method for controlling a diesel engine, the engine being a multi-cylinder engine having a first group of cylinder, coupled to a lean NOx catalyst, a second group of cylinders not coupled to the lean NOx catalyst, and a reductant injector disposed in an engine exhaust coupled to the first group of cylinders for providing reductant to the lean NOx catalyst, the method comprising:

operating said first and second groups of cylinder, according to a first set of operating conditions when a driver demanded torque is greater than a predetermined torque; and operating said first and second group of cylinders according to a second set of operating conditions when said driver demanded torque is less than said predetermined torque wherein said first and second sets of operating conditions are such that a torque provided by said first group of cylinders is different than a torque provided by said second group of cylinders, and said second set of operating conditions further comprises:

discontinuing fuel delivery to the first group of cylinder;

operating the second group of cylinders at an operating point which causes the engine to provide said operator demanded torque with fuel delivery to the first group of cylinders being discontinued; and commanding said injector to provide reductant to the lean NOx catalyst while operating the second group of cylinders at an operating point which causes the engine to provide said operator demanded torque with fuel delivery to the first group of cylinders being discontinued.

26. A method for controlling temperature of an internal combustion engine exhaust gas aftertreatment device, such method comprising:

operating a first portion of a plurality of engine cylinders at a first torque output and operating a second portion of said plurality of engine cylinders at a second torque output when temperature in the aftertreatment device is not within a desired temperature range, the overall torque output of the engine is substantially an operator demanded torque, and said first portion of cylinders is coupled to the aftertreatment device, said operator demanded torque is based on a portion of an accelerator pedal, and said second portion of engine cylinder is decoupled from the aftertreatment device.

27. The method of claim 26 wherein said temperature is based on an output from a temperature sensor located proximate to said aftertreatment device.

28. The method of claim 26 wherein said temperature is based on a model of aftertreatment.

29. The method of claim 26 wherein said exhaust aftertreatment device is a particulate filter, the desired temperature range comprises a temperature greater than an ignition temperature of particulate matter collected in said particulate filter, and said first torque output is greater than a second torque output.

30. The method of claim 26 wherein said exhaust aftertreatment device is a lean NOx catalyst, the desired temperature range is greater than an activation temperature of said lean NOx catalyst, and said first torque output is greater than a second torque output.

31. The method of claim 26 wherein said exhaust aftertreatment device is a lean NOx trap, the desired temperature range for purging NOx from said lean NOx trap is between 250 and 425 degrees C., the first torque output is greater than the second torque output when the temperature is less than 250 degrees C. and the first torque output is less than the second torque output when the temperature is greater than 425 degrees C.

32. The method of claim 26 wherein said exhaust aftertreatment device is a lean NOx trap, the desired temperature range for causing SOx to desorb from said lean NOx catalyst is a temperature greater than 650 degrees C., the first torque output is greater than the second torque output.

* * * * *